United States Patent [19]

Steere

[11] Patent Number: 5,303,687
[45] Date of Patent: Apr. 19, 1994

[54] BLADE MOUNT FOR AN INNER DIAMETER SAW BLADE

[75] Inventor: Jr. Robert E. Steere, Boonton, N.J.

[73] Assignee: Silicon Technology Corporation, Oakland, N.J.

[21] Appl. No.: 756,322

[22] Filed: Sep. 6, 1991

Related U.S. Application Data

[63] Continuation-in-part of Ser. No. 665,410, Mar. 6, 1991, abandoned.

[51] Int. Cl.⁵ ............................................. B28D 1/12
[52] U.S. Cl. ................... 125/13.02; 83/663; 51/73 R
[58] Field of Search .................. 83/698, 676, 663; 125/13.02, 15; 51/73 R

[56] References Cited

U.S. PATENT DOCUMENTS

| 2,713,339 | 7/1955 | Sayers | 125/13.02 |
| 3,154,990 | 11/1964 | Woods | 125/13.02 |
| 4,150,912 | 4/1979 | Gutsche et al. | 125/15 X |
| 4,151,826 | 5/1979 | Otte | 125/13.02 |
| 4,498,449 | 2/1985 | Kachajian | 125/15 |
| 4,716,881 | 1/1988 | Steere | 125/15 |
| 4,864,895 | 9/1989 | Frank | 125/15 X |

FOREIGN PATENT DOCUMENTS

1089307  4/1984  U.S.S.R. ................... 125/15

Primary Examiner—Hien H. Phan
Assistant Examiner—Kenneth E. Peterson
Attorney, Agent, or Firm—Francis C. Hand

[57] ABSTRACT

A blade mount for an I.D. saw blade has an elongated female tensioning ring which has a male pilot lip which fits into a recess in a radial flange of the wheelhead. The male pilot lip and a narrowed annular flexure in the flange of the wheelhead compensate automatically for deflections in the blade mount caused by the tensioned saw blade so as to eliminate saw blade flutter during operation. The female tensioning ring is sized to have a width at least twice the radial thickness thereof so as to resist turning inside out under the tensioning force imposed upon the saw blade.

22 Claims, 2 Drawing Sheets

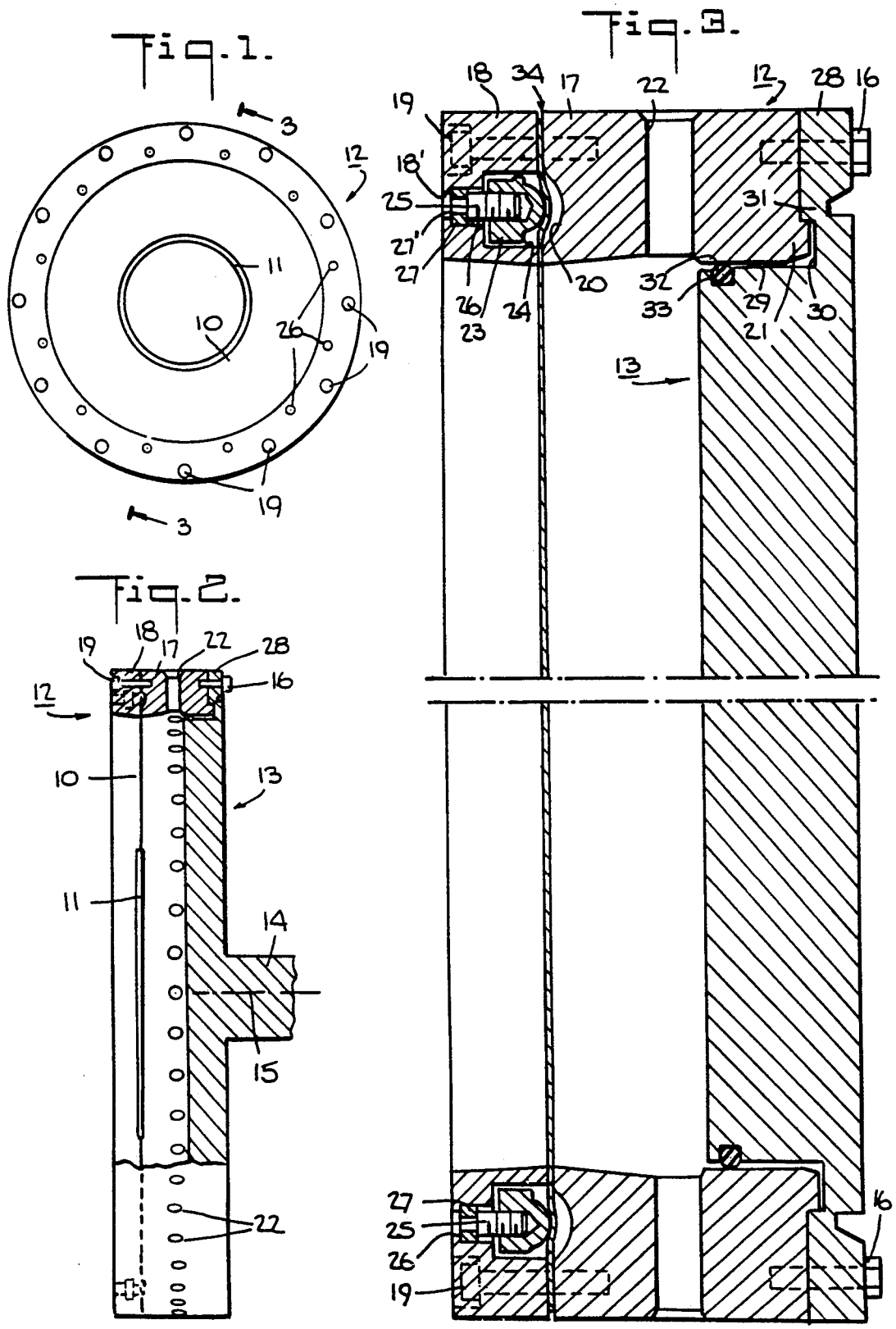

BLADE MOUNT FOR AN INNER DIAMETER SAW BLADE

This is a continuation-in-part application of pending U.S. patent application Ser. No. 07/665,410, filed Mar. 6, 1991, now abandoned.

This invention relates to a blade mount for an inner diameter saw blade.

Heretofore, various types of mountings have been provided for the mounting of inner diameter saw blades in machines for the cutting of thin wafers from cylindrical ingots, for example of silicon material. For example, British Patent 1,162,912; German patent 34 42 730 and published German Patent Application OS 2841653 describe various types of blade mounting arrangements wherein an inner diameter saw blade can be secured in place between a pair of clamping rings and subsequently tensioned by a separate ring.

U.S. Pat. No. 4,716,881 also describes a blade mount for an inner diameter saw blade wherein a saw blade is clamped between a pair of clamping rings while a third tensioning ring is provided for imposing a tensioning force on the saw blade. In addition, the blade mount is mounted on a wheelhead by means of a plurality of mounting bolts disposed about the periphery of the wheelhead.

However, in such constructions, it has been found that a tensioning force imposed upon the saw blade introduces a bending moment on the first clamping ring secured to the wheelhead which is resisted by the bolts used to secure the aforementioned clamping ring to the wheelhead relative to a fulcrum point disposed between the outer peripheries of the two clamping rings. As a result of this internally generated bending moment, the clamping ring tends to be "rolled" inside out such that the clamping ring is turned through a small angle. In addition, the tension force in the blade also generates a moment of twist which acts about the center of cross sectional area of the respect clamping ring. This moment of twist also tends to roll the clamping ring inside out adding to the angular deflection.

It is also known that the tensioning force on a saw blade tends to be non-uniform due to the directional tensile properties of the blade material. Consequently, the resultant angular deflection of the first clamping ring becomes non-uniform around the periphery. This has been confirmed by actual measurements with the blade mount and blade fully tensioned in a free state without the assembly being secured to the wheelhead. Therefore, the influence of the unevenly deflected blade mount would cause a flutter to occur in the wheelhead once attached to the wheelhead during normal operation, i.e. rotation about a wheelhead axis during cutting of an ingot.

Accordingly, it is an object of the invention to reduce flutter in the mounting of an inner diameter saw blade on a wheelhead.

It is another object of the invention to eliminate twisting of clamping rings of a blade mount under the tensioning forces imposed upon a saw blade secured therebetween.

It is another object of the invention to be able to retrofit existing wheelheads with a modified blade mount in a relatively simple and economical manner.

It is another object of the invention to reduce blade flutter automatically in a wheelhead of an ingot slicing machine.

Briefly, the invention provides a blade mount for an inner diameter saw blade which is comprised of a pair of rings for securing an inner diameter saw blade therebetween with one ring having a width greater than twice the radial thickness thereof while means are disposed within the other ring for tensioning the saw blade. In this respect, by using a ring lengthened by at least a factor of two over the radial thickness the resistance to turning inside out in response to the imposition of a blade tensioning force is increased.

In addition, the invention provides a wheelhead having a radially extending flange, a shoulder adjacent to the flange for mounting of the elongated ring of the blade mount thereon and an annular recess in the flange. In this respect, the elongated ring of the blade mount is provided with an annular projection on one side for fitting into the recess of the flange. This annular projection serves as a male pilot lip on the ring while the recess in the flange serves as a female pilot ledge. In this manner, the pilot diameters interact against each other so as to resist slippage during normal wafering operation while counteracting against an angular deflection of the elongated ring due to a tensioning force imposed upon a saw blade.

The flange of the wheelhead may also be provided with a narrowed annular flexure while an annular array of bolts is provided for securing the flange of the wheelhead to the elongated ring of the blade mount. This narrowed annular flexure allows the flange to flex and conform to any residual angular deflection influence of the elongated ring of the blade mount during blade tensioning. In this manner, the main body of the wheelhead will be isolated from this influence to deform and remain running true during operation.

In addition, the wheelhead is provided with an annular groove in the shoulder in order to separate a first portion of the wheelhead from a second portion while means are provided for adjustably moving selected circumferential sections of the first portion relative to the second portion in order to effect deflection of respective sections of a saw blade into a plane perpendicular to the axis of rotation of the wheelhead. In this respect, it has been found that the addition of the groove and the means to adjustably move selected circumferential sections of the wheelhead portion reduces blade flutter by a whole magnitude, for example, the flutter can be reduced to within one micron.

These and other objects and advantages of the invention will become more apparent from the following detailed description taken in conjunction with the accompanying drawings wherein:

FIG. 1 illustrates a front view of a blade mount having an inner diameter saw blade mounted therein;

FIG. 2 illustrates a cross sectional view of a blade mount on a wheelhead of a slicing machine in accordance with the invention;

FIG. 3 illustrates an enlarged cross sectional view of a blade mount and wheelhead constructed in accordance with the invention;

Figure 4:
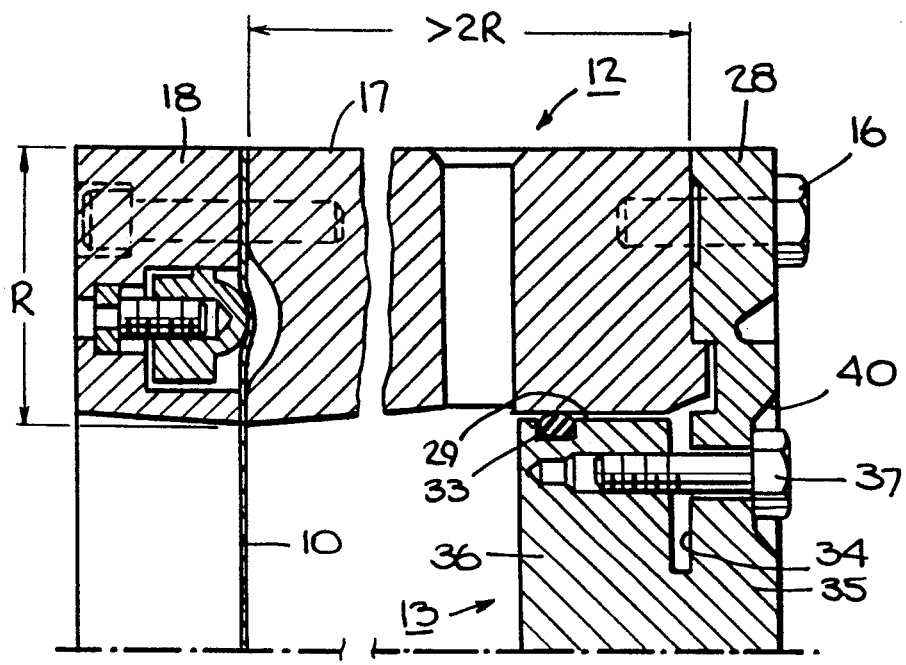
FIG. 4 illustrates a cross sectional view of a wheelhead having a radial groove and means for closing the groove in accordance with the invention.

Referring to FIGS. 1 and 2, an inner diameter saw blade 10 having an inner peripheral cutting edge 11 is mounted within a blade mount 12 which, in turn, is mounted on a wheelhead 13 of a slicing machine (not shown). As indicated in FIG. 2, the wheelhead 13 is secured to a drive shaft 14 so as to be rotated about a longitudinal axis 15 of the shaft 14. In addition, an annular array of mounting bolts 16 are disposed about the periphery of the wheelhead 13 in order to secure the blade mount 12 thereon.

Referring to FIG. 3, the blade mount 12 includes a pair of rings 17, 18 for securing the saw blade 10 therebetween. As indicated, a plurality of peripherally disposed mounting bolts 19 pass through the outer ring 18 through suitable apertures in the blade 10 and into threaded bores (not shown) in the inner ring 17.

The ring 17 serves as a female tensioning ring and has a width at least twice the radial thickness thereof for purposes as described below. In addition, the ring 17 has an annular recess 20 in one face and an annular projection 21 in an opposite face which acts as a male pilot lip as described below. In addition, the ring 17 is provided with a plurality of radial holes 22 which are disposed peripherally in equispaced relation so as to provide for the clearing out of coolant and kerf during operation.

The second ring 18 carries a means therewithin for tensioning the saw blade 10. To this end, the means includes an annular male tensioning ring 23 which is slidably disposed within an annular recess 24 in the ring 18. As indicated, the male tensioning ring 23 is disposed opposite the annular recess 20 in the female tensioning ring 17. In addition, a plurality of circumferentially disposed tensioning set screws 25 are threadably mounted within the ring 23 and project into a plurality of counterbores 26 in the ring 18. A split bearing bushing 27 is also located in each counterbore 26 in abutment with a respective set screw 25 and the ring 18. These bushings 27 permit rotation of the set screws 25 so that the tensioning ring 23 can be moved locally and axially to impose a tensioning force on the saw blade 10 radially within the array of bolts 19.

As indicated in FIG. 3, each bushing 27 has a bore 27' aligned with a bore 18' in the ring 18 with the bores 27', 18' being sufficiently sized to permit passage of a suitable tool into a socket (not shown) of a respective set screw 25 to permit turning of the set screw 25 and, thus, movement of the male tensioning ring 23 relative to the ring 18.

The tensioning means is of generally conventional structure and need not be further described.

As shown in FIG. 3, the wheelhead 13 has a radially extending flange 28, a shoulder 29 adjacent the flange for guiding of the blade mount 12 thereon and an annular recess 30 in the flange 28. This recess 30 serves as a female pilot ledge or shoulder in order to receive the male pilot lip 21 of the ring 17 of the blade mount 12. In this respect, the pilot diameters of the projection 21 and the recess 30 are such as to permit guiding of the blade mount 12 into place while at the same time resisting slippage of the blade mount 12 radially relative to the wheelhead 13 during a wafering operation.

The wheelhead 13 is also provided with a narrowed annular flexure 31 within the circumferential array of bolts 16. This flexure 31 allows the flange 28 to flex and conform to an angular deflection influence caused by tensioning of the saw blade 10 in the blade mount 12. Thus, the main body of the wheelhead 13 is isolated from the influence to deform and remains running true during operation.

A suitable sealing ring 32 such as an O-ring is also provided in an annular recess 33 in the shoulder 29 of the wheelhead 13 for sealingly engaging with the ring 17 of the blade mount 12.

In use, the female tension ring 17 is first assembled onto the wheelhead 13. Then the blade mount 12 is final assembled with the saw blade 10 sandwiched between the two rings 17, 18. Thereafter, the threaded set screws 25 are manipulated about the periphery of the blade mount 12 so as to move the tensioning ring 23 against the saw blade 10 so as to tension the saw blade 10 under a tensioning force P. At this time, the tensioning force P creates a moment Pa about a fulcrum 34 between the peripheries of the rings 17, 18 and, more particularly, between the corner of the ring 17 which engages against the saw blade 10. This moment is resisted by the longitudinal length of the ring 17 so that the ring 17 resists a tendency to be rolled inside out. In other words, the longer the ring 17, the less angular deflection due to the tendency to roll inside out.

The flexure 31 allows the flange 28 to flex and conform to any residual angular deflection influence of the ring 17 during blade tensioning. Residual angular deflection being that which was not fully resisted by the extra longitudinal length of the ring 17.

Further, the annular flexure 31 in the flange 28 of the wheelhead 13 compensates for any angular ovality generated by the influence of any uneven toroidal twisting moments induced in the blade mount 12 during tensioning of the blade 10. In this respect, the flexure 31 is continuous around the wheelhead 13 and is oriented radially so as to deflect axially through small angular displacements as imposed by the deflections of the blade mount 12. The angular ovality deflection of the blade mount 12 is caused by the uneven tensioning of the saw blade 10 due to its anisotropic tensile properties while the toroidal deflection of the blade mount 12 is caused by the tendency of the tensioning force to twist the female tensioning ring 17 inside out.

Further, the blade tension force which is generated during tensioning of the blade also creates a toroidal moment which is counteracted by the mating of the male pilot lip 21 in the recess 30.

The mounting of the blade mount 12 on the wheelhead 13 is such that the main body of the wheelhead 13 will not be bent. This serves to eliminate blade flutter automatically during operation.

Further, the pilot diameter interlock 21, 30, in cooperation with the narrow flexure 31 of the wheelhead flange 28 prevents shear slippage between the wheelhead 13 and blade mount 12. In other words, once the blade 10 is fully tensioned, the ring 17 tries to expand radially outward at the face where it is fastened to the flange 28. The only thing preventing this expansion (or slippage), besides the fastening bolts 16, is the interlock 21, 30. Without the interlock, inadvertent impact forces or the like could possibly overcome the bolt fastening force, causing shear slippage.

The mounting arrangement is such that any unevenness in the blade mount 12 as a result of an unevenness of the total blade tensioning force is corrected. In this sense, the mounting of the blade mount 12 in the wheelhead 13 adjusts to corrections for unevenness automatically.

The mounting of the blade 10 is such that the outside surfaces of the blade mount 12 and wheelhead 13 remain smooth and free of major projections or openings which could pose a safety hazard while spinning.

Figure 5:
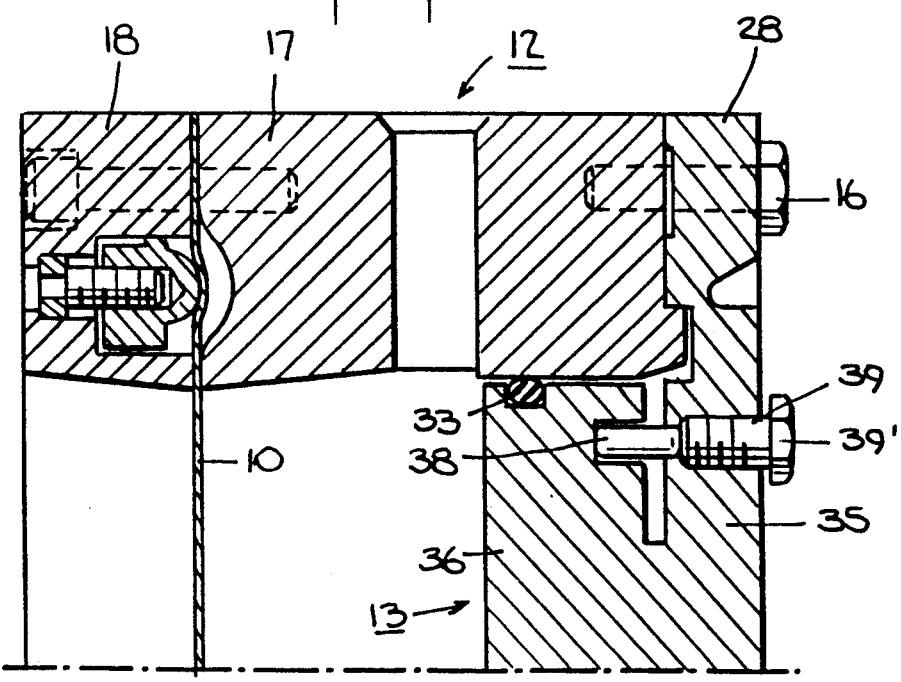
FIG. 5 illustrates a cross sectional view similar to FIG. 4 of a wheelhead having a radial groove and means for opening the groove in accordance with the invention.

Referring to FIGS. 4 and 5, wherein like reference characters indicate like parts as above, in order to further reduce flutter in the saw blade 10, the wheelhead 13 is provided with an annular groove 34 which is disposed radially within the shoulder 29, for example, adjacent to the flange 28 in order to separate two portions 35, 36 of the wheelhead 13 from each other. In addition, means are provided for adjustably moving selected circumferential sections of the first portion 35 of the wheelhead 13 relative to the second portion 36 in order to effect deflection of respective or corresponding sections of the saw blade 10 into a plane perpendicular to the axis of rotation 15 of the shaft 14. As illustrated, this means includes a first series of circumferentially disposed bolts 37, each of which passes through the outer portion 35 of the wheelhead 13 in unthreaded relation while being threaded into the inside portion 36 of the wheelhead 13. Upon threading in of each bolt 37 into the inner portion 36 of the wheelhead, the outer wheelhead portion is moved to the left, as viewed so as to close the groove 34. At the same time, the flange 28 moves to the left, as viewed, in a pivoting counter-clockwise manner about the remainder of the wheelhead 13 so that the corresponding section of the saw blade 10 between the rings 17, 18 is deflected in a counter-clockwise manner towards a true perpendicular plane relative to the axis 15 of the wheelhead 13.

The adjusting means also includes a series of circumferentially disposed dowel pins 38 disposed in the inner portion 36 of the wheelhead 13 and a corresponding series of circumferentially disposed bolts 39 threaded into the outer portion 35 of the wheelhead 13. As indicated, each bolt 39 is aligned and is in abutment with a respective pin 38. Upon threading in of a bolt 39, the outer portion 35 of the wheelhead 13 moves away from the inner portion 36 so as to effect an opening of the groove 34. This, in turn, causes the flange 28 to pivot in a clockwise manner as viewed in FIG. 5, which, in turn, causes the corresponding section of the saw blade 10 to move in a similar manner into a perpendicular plane relative to the axis 15 of the wheelhead 13.

As shown in FIG. 5, each bolt 39 has a head 39' which has a bottom surface spaced with a clearance from the wheelhead 13 at all times during any adjustment. This allows the use of a common wrench to make any adjustments while the heights of the bolts 39 relative to each other will help a technician to know which way the blade 10 will move when performing an adjustment, i.e., the blade 10 will move in the direction of the height of the bolt head 39' upon tightening.

The dowel pins 32 are used to assure easy thread tapping into the radial groove 34 while also providing a replaceable bearing surface for the bolts 39 to bear against.

As illustrated in FIGS. 4 and 5, the outer portion 35 of the wheelhead 13 is integral with the radial flange 28 such that the flange 28 forms an extension of the outer portion 35.

By way of example, where the wheelhead 13 has an outer diameter of 34 inches with the shoulder 29 being formed on an outer diameter of 29.95 inches and with a wheelhead thickness of 2 inches, the groove 34 may have a radial depth of 1.30 inches and a width of 0.13 inches. In this respect, the flange 28 may have a thickness of 0.64 inches while the annular recess 30 has a depth of 0.175 inches.

The bolts 37 used for closing the groove 34 may be disposed in an alternating manner with the bolts 39 which are used to open the groove 34. Further, the bolts 37 may be disposed in equispaced manner, for example, on an angular spacing of 10° with a centerline to centerline angular spacing of 5° between alternating bolts 37 and bolts 39.

As indicated in FIG. 4, the wheelhead 13 can be provided with recesses 40 so that the heads of the bolts 37 can be recessed within the contour of the wheelhead 13 while leaving access space for a suitable tool to engage the head of a bolt 37 for threading in and out of the wheelhead 13.

As indicated in FIG. 5, each bolt 39 is threaded into the wheelhead 13 and is shown to receive the same tool for threading of the bolts 37 within the wheelhead 13.

After the blade mount 12 has been mounted on the wheelhead 13, the wheelhead 13 can be rotated about the axis of rotation 15 in order to measure any flutter within the saw blade 10. Should such be detected, the location or locations where the saw blade 10 may deviate from a true plane, that is, the plane perpendicular to the axis of rotation 15, the bolts 37, 39 for the associated section of the wheelhead 13 can be manipulated so as to bring the deviated section of the saw blade 10 into the true perpendicular plane relative to the axis of rotation 15. In this respect, without the further adjustment, it has been found that a saw blade 10 may exhibit up to 0.001 inch (25 microns) flutter in some cases at the outer rim. By adjusting the bolts 27, 39, so as to open or close the groove 29 at the associated sections, the flutter can be reduced to within 0.00004 inches (1 micron) easily. This represents a whole magnitude of improvement in reducing blade flutter.

The invention thus provides for the mounting of a blade mount on a wheelhead which does not require additional machined parts in existing wafering machines. In this respect, the structural construction is simple and cost effective.

Further, the invention further provides for the mounting of a blade mount on a wheelhead in a relatively simple non-time-consuming manner. Further, relatively few adjustments are required in order to secure the blade mount in place on the wheelhead.

Further, the invention permits an internal diameter saw blade to be installed normally in a blade mount without regard to positioning the anisotropic direction of the blade material.

What is claimed is:

1. A blade mount for an inner diameter saw blade comprising
   a first tensioning ring having a width thickness and a radial thickness, said width thickness being at least twice said radial thickness thereof;
   a second ring coaxial of said first ring for securing an inner diameter saw blade therebetween; and
   means disposed within said second ring for tensioning the saw blade.

2. A blade mount as set forth in claim 1 wherein said first ring has an annular recess in one side thereof and said means includes a tensioning ring within said second ring in facing relation to said recess in said first ring and an annular row of adjustment screws threaded into said tensioning ring for adjusting said tensioning ring relative to said first ring.

3. A blade mount as set forth in claim 2 wherein said means further includes a plurality of bearing bushings, each said bushing being axially aligned with a respective adjustment screw and disposed in a counterbore passing through said second ring between said respective screw and said second ring to permit relative rotation therebetween.

4. In combination
a wheelhead having a radially extending flange, a shoulder adjacent said flange and an annular recess in said flange;
a first ring having an annular projection on one side fitting into said recess of said flange and an annular recess on an opposite side;
a second ring coaxial of said first ring for securing an inner diameter saw blade therebetween; and
means disposed within said second ring for tensioning the saw blade.

5. The combination as set forth in claim 4 wherein said first ring has a width at least twice the radial thickness thereof.

6. The combination as set forth in claim 4 wherein said flange of said wheelhead has a narrowed annular flexure therein and which further comprises an annular array of bolts securing said first ring to said flange of said wheelhead.

7. The combination as set forth in claim 6 which further comprises an annular O-ring between said first ring and said shoulder of said wheelhead.

8. The combination as set forth in claim 6 wherein said means includes a tensioning ring within said second ring in facing relation to said recess in said first ring and an annular row of adjustment screws threaded into said tensioning ring for adjusting said tensioning ring relative to said first ring.

9. The combination as set forth in claim 8 wherein said means further includes a plurality of bearing bushings, each said bushing being axially aligned with a respective adjustment screw and disposed in a counterbore passing through said second ring between said respective screw and said second ring to permit relative rotation therebetween.

10. The combination as set forth in claim 6 wherein said means includes an annular tensioning ring coaxial of said first and second rings for imposing a tensioning force on a saw blade between said first and second rings radially within said array of bolts.

11. The combination as set forth in claim 10 wherein said first ring has a width at least twice the radial thickness thereof.

12. The combination as set forth in claim 4 wherein said first ring has a plurality of radial holes for passage of coolant therethrough.

13. The combination as set forth in claim 4 which further comprises an internal diameter saw blade coaxially secured between said rings.

14. A blade mount as set forth in claim 4 wherein said wheelhead has an annular groove disposed radially in said shoulder to separate a main portion of said wheelhead from a minor portion of said wheelhead, an means for adjustably moving selected circumferential sections of said minor portion of said wheelhead relative to said major portion to effect deflection of respective sections of a saw blade between said rings.

15. A blade mount as set forth in claim 14 wherein said means includes a first series of circumferentially disposed bolts passing through said minor portion and threaded into said major portion of said wheelhead to effect closing of said groove upon threading of said bolts into said major portion.

16. A blade mount as set forth in claim 14 wherein said means includes a series of circumferentially disposed pins disposed in said major portion of said wheelhead and a series of circumferentially disposed bolts threaded into said minor portion, each bolt being aligned in abutment with a respective pin to effect opening of said groove upon threading of said bolts into said minor portion.

17. A blade mount as set forth in claim 14 wherein said minor portion of said wheelhead is integral with said flange.

18. In combination,
a wheelhead having a central axis of rotation, a radially extending flange, a shoulder adjacent said flange and an annular groove in said shoulder to separate a first portion of said wheelhead from a second portion of said wheelhead;
a first ring mounted on said shoulder;
a second ring coaxial of said first ring;
an inner diameter saw blade secured between said rings perpendicularly of said axis of rotation; and
means for adjustably moving selected circumferential sections of said first portion of said wheelhead relative to said second portion to effect deflection of respective sections of said blade into a plane perpendicular to said axis of rotation.

19. The combination as set forth in claim 18 wherein said means includes a first series of circumferentially disposed bolts passing through said first portion and threaded into said section portion of said wheelhead to effect closing of said groove upon threading of said bolts into said major portion.

20. The combination as set forth in claim 18 wherein said means includes a series of circumferentially disposed pins disposed in said major portion of said wheelhead and a series of circumferentially disposed bolts threaded into said minor portion, each bolt being aligned in abutment with a respective pin to effect opening of said groove upon threading of said bolts into said minor portion.

21. The combination as set forth in claim 18 wherein said first portion is integral with said flange.

22. The combination as set forth in claim 21 which further comprises an annular array of bolts securing said first ring to said flange.

* * * * *

UNITED STATES PATENT AND TRADEMARK OFFICE
CERTIFICATE OF CORRECTION

PATENT NO. : 5,303,687
DATED : April 19, 1994
INVENTOR(S) : Robert E. Steere, Jr.

It is certified that error appears in the above-identified patent and that said Letters Patent is hereby corrected as shown below:

Column 1, line 40 change "respect" to -respective-

Column 2, line 8 after "thickness" insert -,-

Column 7, lines 55 change "an" to -and-

Column 8, line 40 change "section" to -second-

Signed and Sealed this

Ninth Day of August, 1994

Attest:

BRUCE LEHMAN

Attesting Officer

Commissioner of Patents and Trademarks